United States Patent
Dudar

(10) Patent No.: US 9,790,874 B2
(45) Date of Patent: Oct. 17, 2017

(54) METHOD FOR MITIGATING WET-FOULING OF SPARK PLUGS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/000,856

(22) Filed: Jan. 19, 2016

(65) Prior Publication Data

US 2017/0204796 A1 Jul. 20, 2017

(51) Int. Cl.
| F02D 41/00 | (2006.01) |
| F02D 41/06 | (2006.01) |
| F02M 25/08 | (2006.01) |
| F02D 9/10 | (2006.01) |
| F02D 13/02 | (2006.01) |

(52) U.S. Cl.
CPC ......... *F02D 41/0035* (2013.01); *F02D 9/105* (2013.01); *F02D 13/0207* (2013.01); *F02D 41/0002* (2013.01); *F02D 41/004* (2013.01); *F02D 41/009* (2013.01); *F02D 41/064* (2013.01); *F02M 25/089* (2013.01); *F02M 25/0818* (2013.01); *F02M 25/0836* (2013.01); *F02M 25/0854* (2013.01); *F02D 2041/002* (2013.01); *F02M 2025/0881* (2013.01)

(58) Field of Classification Search
CPC ... F02D 41/003–41/004; F02D 41/06–41/065; F02D 41/22; F02D 41/221; F02D 2041/228; F02P 11/00–11/02; F02P 11/06
USPC ......... 123/625, 630, 406.13, 406.14, 406.27, 123/179.3, 179.16, 518–520; 701/113
See application file for complete search history.

(56) References Cited

U.S. PATENT DOCUMENTS

| 4,205,650 A | 6/1980 | Szwarcbier |
| 5,161,497 A | 11/1992 | Simko et al. |
| 6,318,345 B1 | 11/2001 | Weber et al. |
| 6,463,889 B2 | 10/2002 | Reddy |
| 6,505,605 B2 | 1/2003 | Yamada et al. |
| 7,305,957 B2 | 12/2007 | Mashiki |
| 7,523,744 B2 * | 4/2009 | Ayame ............... F02D 41/0025 123/1 A |
| 8,150,604 B2 | 4/2012 | Ma et al. |
| 9,109,348 B2 | 8/2015 | Saitou et al. |
| 2004/0100179 A1 | 5/2004 | Boley et al. |
| 2005/0022776 A1 * | 2/2005 | Montgomery ........ F02D 41/008 123/295 |
| 2007/0137601 A1 * | 6/2007 | Stanglmaier .......... F02D 41/003 123/179.16 |

OTHER PUBLICATIONS

Dudar, Aed M., "System and Methods for Cold Starting an Internal Combustion Engine," U.S. Appl. No. 14/859,018, filed Sep. 18, 2015, 79 pages.

* cited by examiner

*Primary Examiner* — Erick Solis
*Assistant Examiner* — Robert Werner
(74) *Attorney, Agent, or Firm* — James Dottavio; McCoy Russell LLP

(57) ABSTRACT

Methods and systems are provided for the mitigation of wet-fouling of the spark plugs of an engine. In one example, a method may include, after spark plug fouling has been detected prior to an engine start, drawing fresh air through the EVAP system of an engine, heating it, and flowing the heated gas through one or more cylinders of an engine while the engine is not rotating.

19 Claims, 6 Drawing Sheets

METHOD FOR MITIGATING WET-FOULING OF SPARK PLUGS

FIELD

The present description relates generally to methods and systems for drying wet-fouled spark plugs of an engine.

BACKGROUND/SUMMARY

In gasoline engines, an air/fuel mixture is ignited within a cylinder by a spark from a spark plug. Spark plugs of an engine may become fouled, preventing the engine from starting and/or increase cranking during starting. Two examples of spark plug fouling are carbon fouling and wet fouling. Carbon-fouled spark plugs have increased carbon build-up on an electrode of the spark plug. Wet-fuel fouled spark plugs are caused by liquid fuel buildup around the electrode, also known as engine flooding. An engine may flood due to rich fueling during extreme temperature-related weather conditions, because of a short engine operation after engine start, when operators depress/pump the gas pedal repeatedly during cranking, or due to excess fuel inside the cylinders. When an engine floods, the spark plugs become wet and cannot produce a spark at the electrode, thus delaying or preventing engine start. In some instances, engine flooding may cause a frustrated vehicle operator to continue cranking the engine until the battery drains.

U.S. Pat. No. 8,150,604 discloses a method to reduce spark plug fouling by making a determination of a spark plug fouling condition by an engine controller from information collected from a number of sensors probing the engine system. Once this method determines a fouling condition, it adjusts one of a number of engine operation parameters such as shutting-off fuel injection during cranking conditions, warming up the engine at a an increased rate that is faster than a normal engine warm-up rate, and reducing the amount of fuel provided to the engine during the initial cranking or start-up of the engine.

However, the inventors herein have recognized an issue with the above approach. While the mechanisms described in U.S. Pat. No. 8,150,604 may help delay or prevent future spark plug fouling, no solutions are provided to rapidly mitigate spark plug wet-fouling after it has already occurred. While wet-fouled spark plugs will eventually dry over time, or they can be removed and dried with compressed air or with a heat gun, such methods are either intrusive or time consuming. Accordingly, the inventors offer a method to at least partly address the above issues. In one embodiment, a method for an engine system is disclosed comprising, responsive to detecting spark plug fouling prior to an engine start, transferring heat to a gas in the engine system, and flowing the heated gas through one or more cylinders of an engine while the engine is not rotating. In this way, once wet-fouling of a spark plug is detected, a plurality of engine operating parameters may be adjusted to direct the flow of heated air through the cylinders of an engine to evaporate the liquid fuel fouling the spark plugs. The detection of the wet-fouling of a spark plug may comprise, in one example, the detection of a throttle position during engine cranking of the prior engine start attempt, or in another example, the detection of a threshold number of prior engine start attempts being reached. The heated air flowing through one or more cylinders of the engine may comprise flowing one or more of heated fuel vapors and heated fresh air from an evaporative emission control (EVAP) system through the one or more cylinders of the engine.

The current disclosure describes a method to perform spark plug drying in-situ using the enhanced evaporation rates afforded by forced convection. By pumping hot air through the cylinder, the fuel may evaporate and be carried away into the exhaust system of an engine at a rate that may be faster than that obtained when the fuel on the spark plugs is allowed to evaporate by the effect of natural convection currents.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for the drying of wet-fouled spark plugs. The disclosed method takes advantage of existing evaporative leak check modules (ELCMs) to provide a hot, forced airflow directly onto a wet-fouled spark plug. As described in FIG. 2, the ELCM, whose pump is capable of drawing ambient air, is fluidically connected to an evaporative emission control (EVAP) canister fitted with a heater. The typical function of the EVAP canister is to capture fuel vapors originating at the fuel tank to prevent them from reaching the atmosphere in order to comply with environmental regulations. Once the canister is saturated with vapors, an engine controller may direct the flow of ambient air to flush the captured fuel vapors into the intake manifold of an engine and into to its cylinders. The flushing of the canister may take place during normal engine operation to keep the canister adsorbent from saturating with fuel. This procedure may include drawing ambient air through a heated EVAP canister to accelerate desorption and flow of revaporized fuel. The ELCM is typically utilized when performing fuel leak detection when the engine is not in operation. The ELCM pump may be used in either vacuum or positive pressure modes to produce a predetermined pressure within the fuel system in order for the engine controller to assess whether pressure deviations therefrom may be correlated to a fuel system leak. The disclosed method makes use of ELCM components together with an engine's capacity to manipulate the position of the intake and exhaust valves of a cylinder, e.g., variable cam timing (VCT) control, in order to guide the flow of hot air over wet-fouled spark plugs once wet-fouled spark plugs are detected, such as based on a wide open throttle (WOT) signal during crank. This method may sequentially perform the described procedure for each of the cylinders of an engine by spinning an engine electrically, avoiding the injection of additional fuel, via a starter motor or a direct current generator in a hybrid vehicle.

Figure 1:
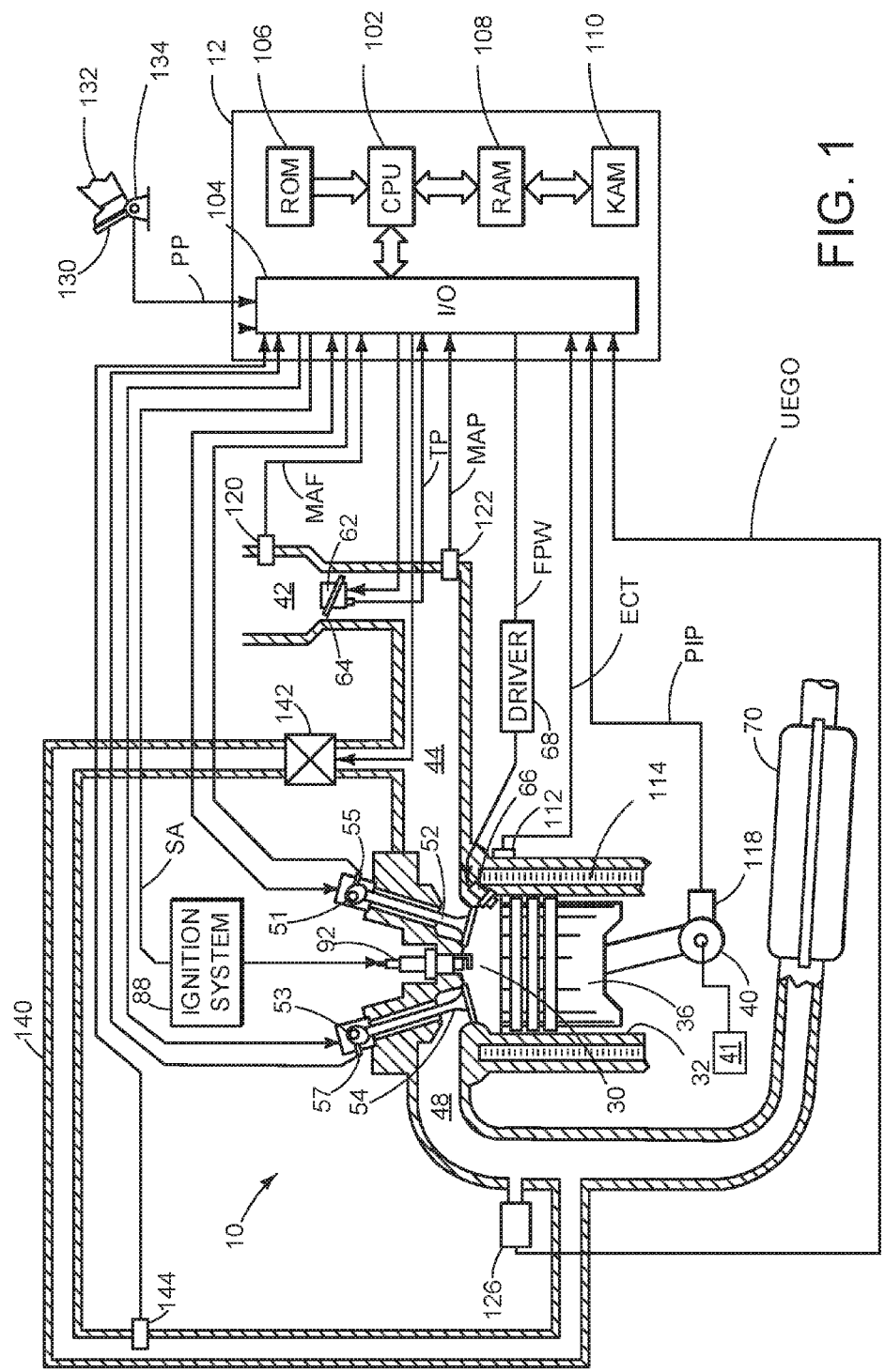
FIG. 1 shows a schematic diagram of a combustion chamber of an internal combustion engine.
Figure 2:
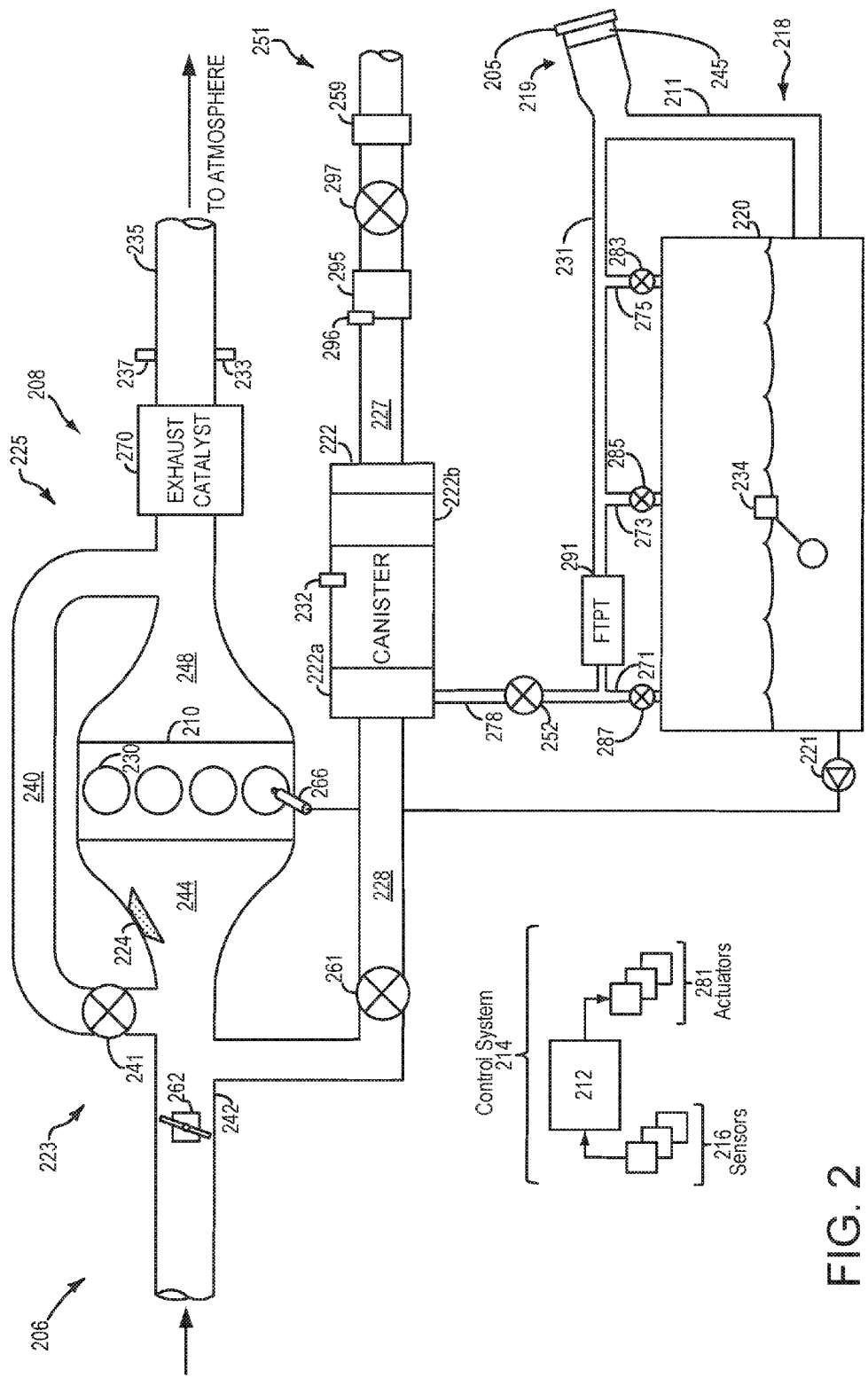
FIG. 2 schematically shows an example vehicle system with a fuel system and an evaporative emissions system.
Figure 3:
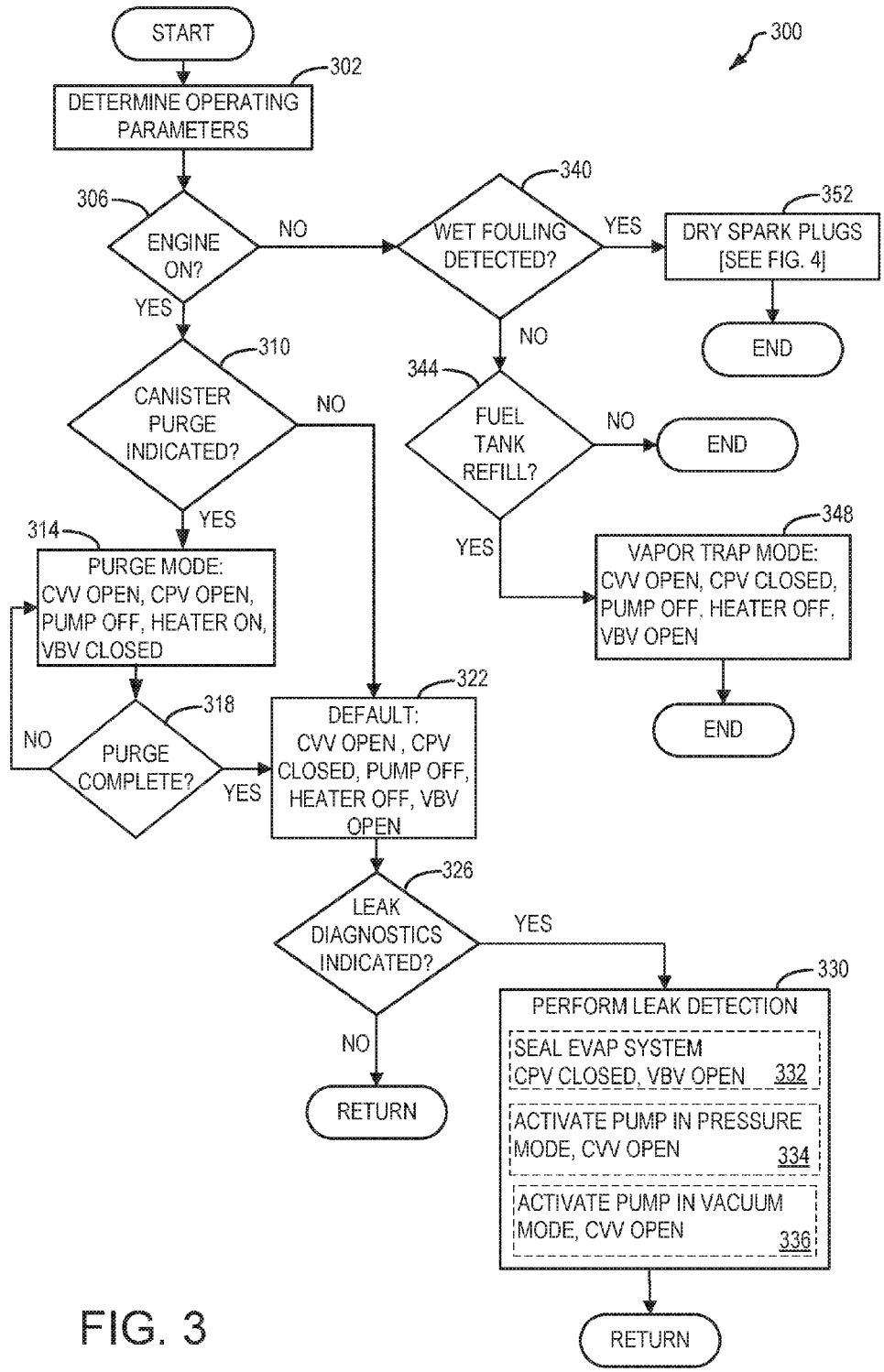
FIG. 3 shows a flowchart illustrating a method for controlling fuel system evaporative emissions.
Figure 4:
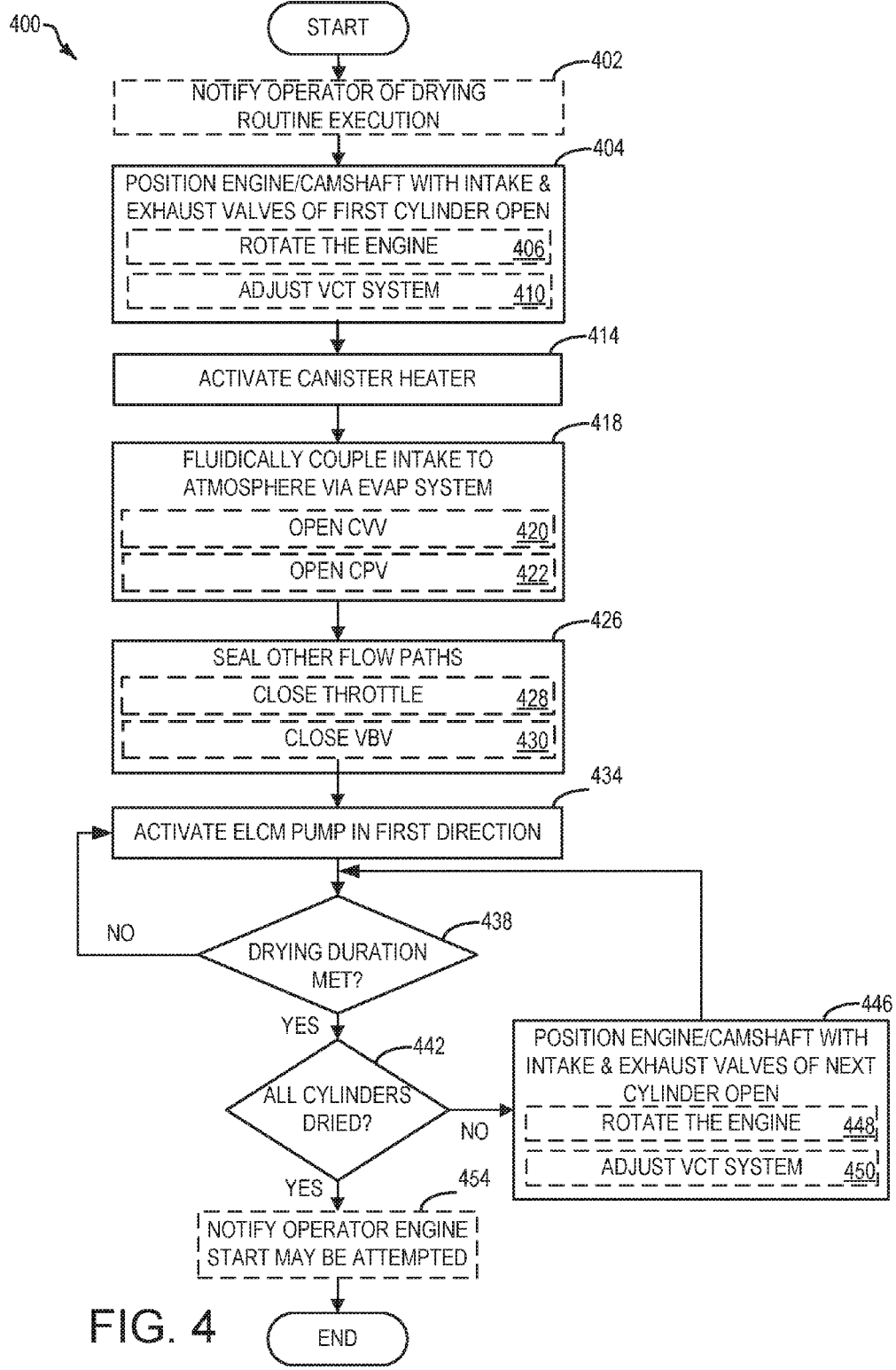
FIG. 4 shows a flowchart illustrating a method to dry wet-fouled spark plugs.
Figure 5:
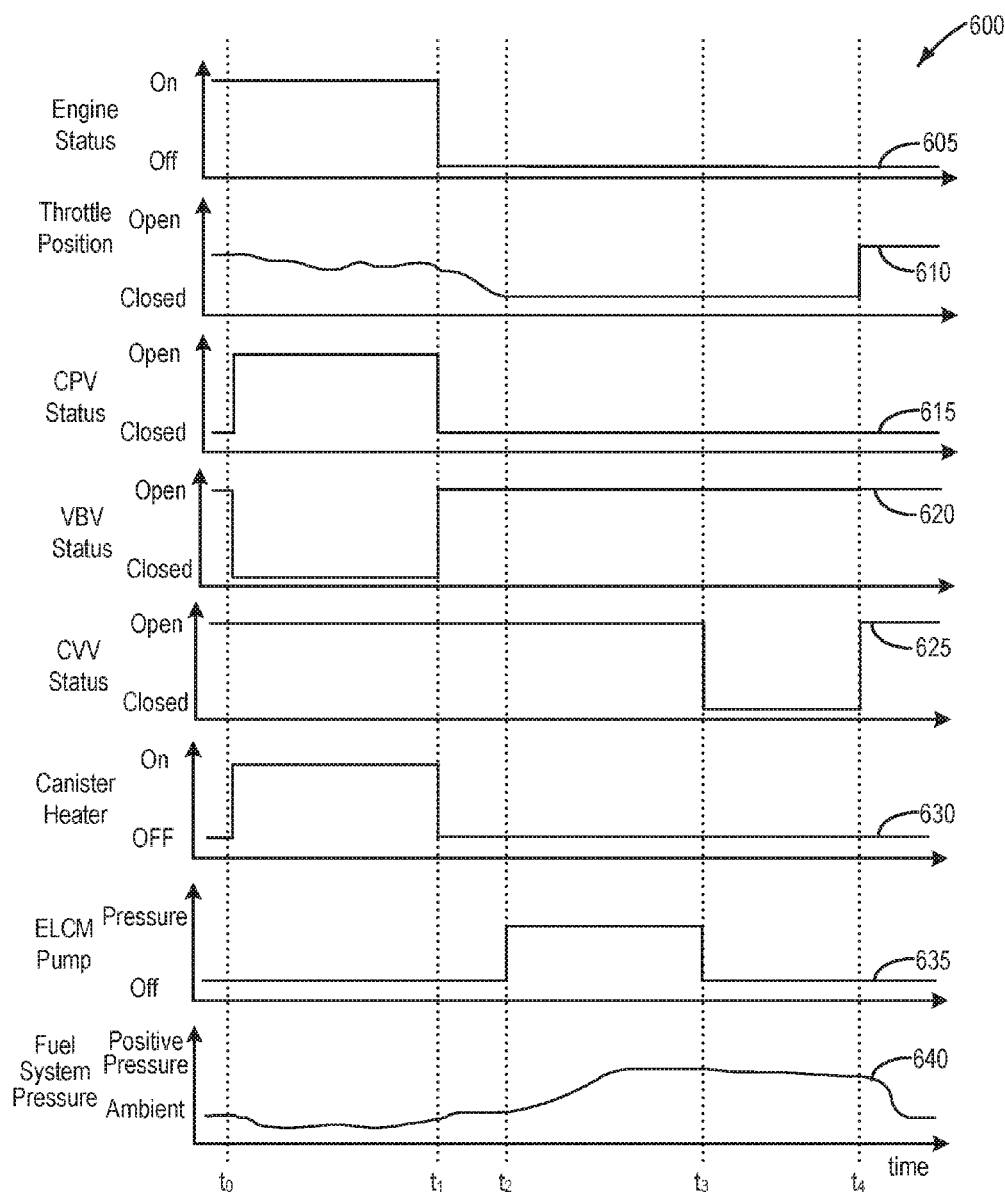
FIG. 5 shows an example timeline for evacuating uncombusted fuel and residual hydrocarbons to an exhaust catalyst, and the detection of fuel system leaks following an engine-off event, according to the method of FIG. 3.
Figure 6:
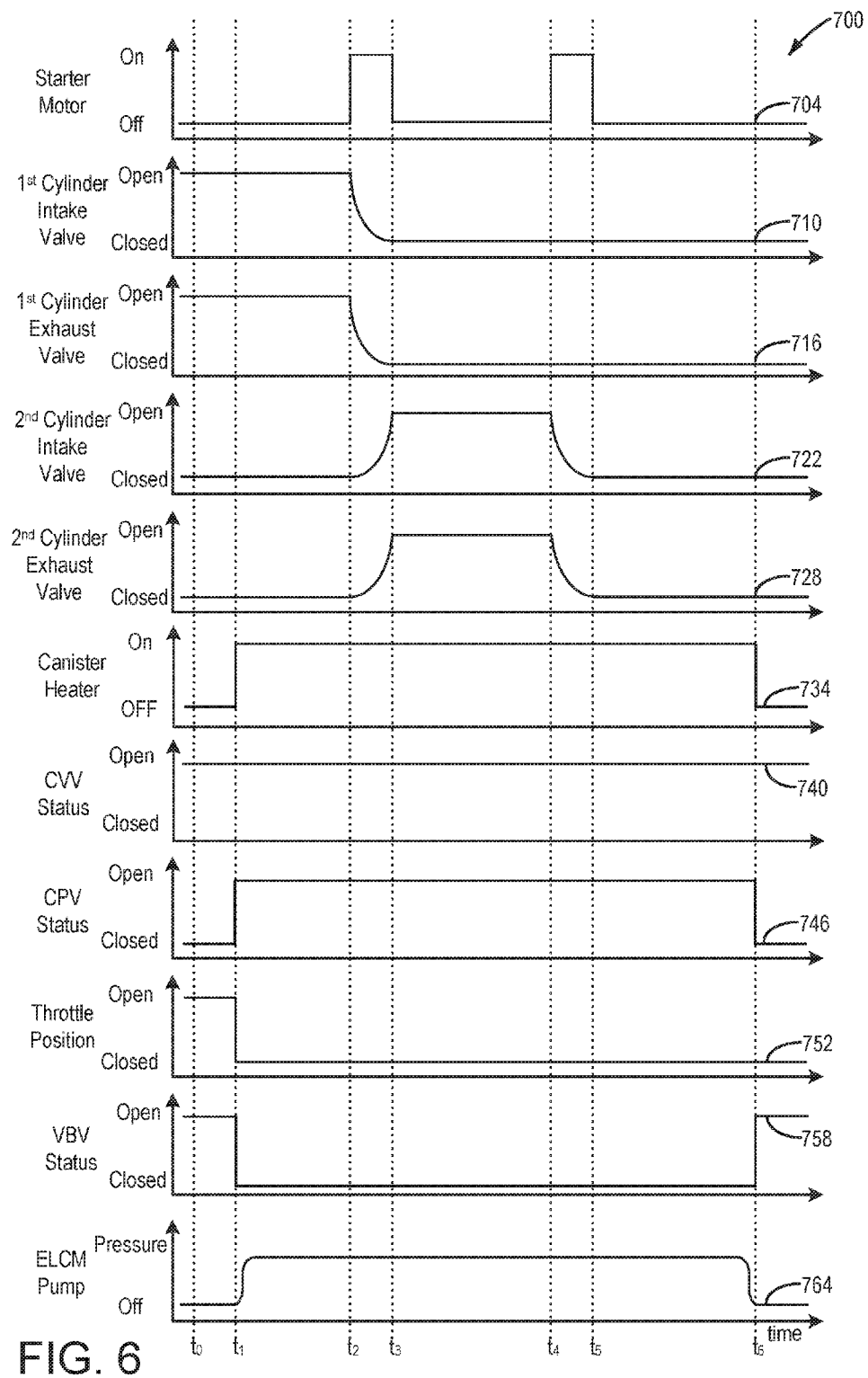
FIG. 6 shows an example timeline for drying wet-fouled spark plugs according to the method of FIG. 4.

The schematic diagram in FIG. 1 shows one cylinder of a multi-cylinder engine, while FIG. 2 depicts a non-limiting example of the engine in FIG. 1 in which the engine's fuel system and an evaporative emissions system are included. FIG. 3 shows a flowchart illustrating, in one example, a method to control the purging of an EVAP canister, in a second example the method to trap fuel vapors during tank refilling, and in another example, the method to perform an evaporative leak detection within the fuel system. FIG. 4 shows the flowchart for the spark plug drying method utilizing the components of the EVAP/ELCM system. FIG. 5 shows an example timeline for purging fuel from the EVAP canister, and a second example for the detection of fuel system leaks, using the ELCM, following an engine-off event, according to the method of FIG. 3. FIG. 6 shows an example timeline for drying wet-fouled spark plugs using the EVAP/ELCM system according to the method of FIG. 4.

FIG. 1 displays a schematic diagram showing one cylinder of multi-cylinder engine 10, which may be included in a propulsion system of a vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor 41 may be coupled to crankshaft 40 via a flywheel to enable a starting operation of engine 10. Combustion chamber 30 may receive intake air from intake manifold 44 via intake passage 42 and may exhaust combustion gases via exhaust passage 48. Intake manifold 44 and exhaust passage 48 may selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 may provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake manifold 44 via EGR passage 140. The amount of EGR provided to intake manifold 44 may be varied by controller 12 via EGR valve 142. Further, an EGR sensor 144 may be arranged within the EGR passage and may provide an indication of one or more pressure, temperature, and concentration of the exhaust gas. In some examples, sensor 144 is a differential pressure transducer detecting pressure drop across a flow control orifice placed either upstream or downstream of the EGR valve which will also provide an indication of the amount of EGR. Sensor 144 also may also be a position sensor which can detect EGR valve flow area changes based upon commands from controller 12. Further, during some conditions, a portion of combustion gases may be retained or trapped in the combustion chamber by controlling exhaust valve timing, such as by controlling a variable valve timing mechanism.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAP sensor without a MAF sensor. In some embodiments multiple MAP sensors may be used, for example one per bank of cylinders or one per cylinder.

During stoichiometric operation, the MAP sensor can give an indication of engine torque. Further, this sensor, along with the detected engine speed, may provide an estimate of charge (including air) inducted into the cylinder. In one example, sensor 118, which is also used as an engine speed sensor, may produce a predetermined number of equally spaced pulses every revolution of the crankshaft.

During the operation of a multi-cylinder engine each cylinder undergoes a four-stroke cycle. The cycle includes an air intake stroke during which intake valve 52 is open and exhaust valve 54 is closed. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g. when cylinder 30 is at its largest volume) is typically referred to by those of skill in the art as bottom dead center (BDC). This is followed by a compression stroke, when both intake valve 52 and exhaust valve 54 are closed, and piston 36 moves toward the cylinder head so as to compress the air within cylinder 30. The point at which piston 36 is at the end of its stroke and closest to the cylinder head (e.g., when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as spark plug 92, resulting in combustion. Additionally or alternatively compression may be used to ignite the air/fuel mixture.

Storage medium read-only memory 106 may be programmed with computer readable data representing instructions executable by processor 102 for performing the method described below, as well as other variants that are anticipated but not specifically listed. The controller 12 receives signals from the various sensors of FIG. 1 (such as MAP sensor 122) and employs the various actuators (such as fuel injector 66) of FIG. 1 to adjust engine operation based on the received signals and instructions stored on a memory of the controller.

As described above, FIG. 1 shows one cylinder of a multi-cylinder engine, and each cylinder may similarly include its own set of intake/exhaust valves, fuel injector, spark plug, etc. Further, the above-described aspects of the engine system are non-limiting, and other configurations are possible. For example, the system may not have exhaust air recirculation. In other examples, the system may further comprise a turbocharger supplying compressed air to the intake manifold.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. Engine 210 is one non-limiting example of engine 10 of FIG. 1, and thus the components described above with respect to FIG. 1 may be included in engine system 208. The engine 210 includes an engine intake 223 and an engine exhaust 225. An exhaust gas recirculation (EGR) system may route a desired portion of exhaust gas from exhaust manifold 248 to intake manifold 244 via EGR passage 240. The amount of EGR provided to intake manifold 244 may be varied by controller 212 via EGR valve 241. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be present in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump nozzle into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, where the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister. In another example, a heater 222b may be incorporated into canister 222 to facilitate desorption of trapped fuel vapors from the canister adsorbent.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that vapor blocking valve 252 (VBV) may control venting of fuel tank 220 with the atmosphere. VBV 252 may be positioned between the fuel tank and the fuel vapor canister within conduit 278. VBV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open vapor blocking valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open vapor blocking valve 252, while maintaining canister purge valve 261 closed, to depressurize the fuel tank before allowing enabling fuel to be added therein. As such, vapor blocking valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing vapor closing valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located downstream of exhaust catalyst 270, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include fuel injector 266, throttle 262, vapor blocking valve 252, pump 221, and refueling lock 245. Controller 212 may receive input data from the various sensors, process the input data, and trigger the actuators in response to the processed input data based on instruction or code programmed therein corresponding to one or more routines.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a normally open valve that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

When an engine is flooded, the methods provided in the current disclosure make use of the engine's emissions control (EVAP) system and evaporative leak check module (ELCM), the typical operation of which is described above regarding FIG. 2, to provide a hot, forced airflow directly onto the engine's wet-fouled spark plugs. Spark plug wet-fouling may be detected from a wide open throttle (WOT) signal, a fuel rich mixture by a universal exhaust gas oxygen (UEGO) sensor, and/or by lack of an engine start after a predetermined number of unsuccessful attempts. Upon determination of engine flooding, an engine may be rotated to position a first cylinder (and through the variable cam timing (VCT) mechanism, where needed) to open the intake and exhaust valves of the cylinder.

The EVAP canister heater may be activated, and the cylinder may be fluidically coupled to the atmosphere by opening the canister vent valve and the canister purge valve. The canister vent valve connects the EVAP system to the atmosphere, while the canister purge valve connects the EVAP system to the engine intake manifold and into the cylinders. To restrict the flow of gas through this route, other flow paths may be sealed by closing the intake throttle valve, and closing the vapor blocking valve (VBV) that connects the EVAP system to the fuel tank.

The ELCM pump may be activated to draw in fresh air through the canister vent line and through the heated EVAP canister. This way the fresh air, and any fuel vapors that may desorb from the canister adsorbent, may form a hot gas mixture that may flow directly into the first cylinder. Hot gas may flow through the first cylinder to dry the spark plug for a selected duration. Additional fuel vapors may be added to the hot gas as a result of the evaporation of the liquid fuel fouling the spark plug of the first cylinder. This gas mixture may then flow out of the cylinder through the exhaust manifold and the fuel vapors may be trapped in the exhaust catalyst for eventual conversion before the gas may be released into the atmosphere. The disclosed method may repeat the spark plug drying routine described above for all the other cylinders of the engine. After all cylinders have been dried, the vehicle operator may attempt an engine start.

FIG. 3 shows a flowchart for method 300 comprising the various modes of operation of the EVAP/ELCM system. In the purge mode, fuel vapors trapped by the adsorbent in EVAP canister may be flushed. In the vapor trap mode, the EVAP canister may be used to trap fuel vapors released during the refilling of fuel tank. The leak detection mode may be deployed by an engine controller to detect leaks within the fuel system. The wet-fouling detection and spark plug drying mode may be implemented after an engine controller has detected a spark plug wet-fouling condition. The spark plug drying method is presented in FIG. 4. Instructions for carrying out method 300 and the rest of the methods included herein may be executed by a controller (such as controller 12 of FIG. 1 or controller 212 of FIG. 2) based on instructions stored on a memory of the controller and in conjunction with signals received from sensors of the engine system, such as the sensors (e.g., the throttle position sensor, the UEGO sensor, the EVAP canister temperature sensor) described above with reference to FIGS. 1 and 2. The controller may employ engine actuators (e.g., the starter motor, the camshaft actuators, the ELCM pump, CVV, CPV, VBV, intake throttle) of the engine system to adjust engine operation, according to the methods described below.

Method 300 includes, at 302, determining engine operating parameters including engine speed and load, barometric pressure, MAP and MAF, engine and/or manifold temperature, driver requested torque, etc. At 306, method 300 determines if an engine is on based on the parameters determined at 302. If at 306 method 300 determines that an engine is off, it may proceed to 340. At 340 method 300 determines if an engine is flooded. The engine may be indicated as being flooded based on one or more suitable operating parameters, such as detection of a wide open throttle during engine cranking. During engine flooding, engines may be configured to reduce or cease fuel injection during cranking when a wide open throttle (WOT) signal generated when a vehicle operator presses down the pedal to its maximum extent. A WOT signal is an indication to an engine controller that the engine is flooded. In this case, a controller scales back, or completely suppresses, the fuel injection pulses. In one example of the disclosed method, a WOT signal during crank is recognized as a trigger to carry out the spark plug drying method. Other triggers may be the detection of a fuel rich mixture by a universal exhaust gas oxygen (UEGO) sensor and/or the lack of engine start after a predetermined number of attempts.

When wet-fouling of a spark plug is detected at 340, method 300 may proceed to 352, to carry out a spark plug drying routine. This routine is fully described in FIG. 4. After the spark plug drying routine is completed, method 300 may end. If engine flooding is not detected at 340, method 300 may proceed to 344. At 344, method 300 determines if a fuel tank is being refilled. If no fuel tank refill is detected method 300 ends. However, if fuel tank refill is detected method 300 proceeds to 348. At 348 method 300 performs a vapor trap mode routine in which both a canister vent valve (CVV) (e.g., CVV 297) controlling the flow of fresh air from the atmosphere to a fuel vapor canister and a vapor blocking valve (VBV) (e.g., VBV 252) controlling the flow of fuel vapors from the fuel tank to a fuel vapor canister may be opened, a canister purge valve (CPV) (e.g., CPV 261) controlling the flow of fuel vapors from a fuel vapor canister to the engine may be closed, and a pump of an evaporative leak control module (ELCM) (such as ELCM 295) typically carrying out evaporative fuel leak diagnostics and a fuel vapor canister heater (e.g., canister heater 222b) may be both deactivated, or kept deactivated. The state of these parameters may remain in place while the fuel tank is being refilled, at the end which process method 300 may end. This way the buildup of pressure within the fuel tank system may be avoided and any fuel vapors generated during refueling may be trapped by the EVAP canister.

If at 306 it is determined that the engine is on, method 300 proceeds to 310. At 310, method 300 determines if a canister purge is indicated. A canister purge may be indicated based on an estimated or measured canister load reaching a threshold, a threshold amount of time having elapsed since a previous purge, or based on other parameters. If a canister purge is indicated, method 300 proceeds to 314. At 314, method 300 adjusts the operating parameters of an emission control (EVAP) system (such as EVAP system 251 in FIG. 2) to carry out a canister purge, comprising opening both a canister vent valve (CVV) (e.g., CVV 297) and a canister purge valve (CPV) (e.g., CPV 261), closing a vapor blocking valve (VBV) (e.g., VBV 252), deactivating a pump of an evaporative leak control module (ELCM) (such as ELCM 295), and activating a fuel vapor canister heater (e.g., canister heater 222b). This way fresh air may be drawn in through the canister vent, and as it flows through the canister it may be heated, increasing the rate at which the trapped fuel vapors may be desorbed and conducted through a purge line (such as purge line 228) into an engine intake passage (such as intake passage 242). Therein the fuel vapors may be mixed with ambient air drawn through a throttle valve (such as throttle valve 262), in some examples combined with recirculated exhaust gas delivered through an EGR passage (such as EGR passage 240), and delivered into an intake manifold (e.g., intake manifold 244). The gas mixture is then distributed across to an engine's cylinders (such as cylinders 230) wherein it is combusted.

At 318, method 300 determines if purge routine 314 has been completed. The purge may be indicated as being complete once the canister load drops below a lower threshold. If the canister purge is not complete, the method may loop back to 314 to continue to carry out the purge until, for example, a threshold duration has been observed. If the purge routine has been completed, method 300 proceeds to 322. If at 310, method 300 determines that a canister purge is not indicated, method 300 may also proceed to 322.

At 322 several engine operating parameters are returned to their default positions, comprising opening, or keeping open, the canister vent valve, opening the vapor blocking valve, closing the canister purge valve, deactivating the canister heater, and deactivating, or keeping deactivated, the ELCM pump. At 326 method 300 determines if a diagnostic routine for evaporative leaks within the fuel system is indicated. A diagnostic routine for evaporative leaks may be indicated when a threshold amount of time has elapsed since a previous routine was carried out, if the engine is off, and/or based on other parameters. If no diagnostic routine is indicated, method 300 returns. However, if leak diagnostics are indicated, method 300 proceeds to 330 to perform a leak detection routine. At 330, the EVAP system may be sealed. First, the canister purge valve may be closed, and the vapor blocking valve opened at 332. At 334, the ELCM pump may be activated in a first direction, turning it on in positive pressure mode. While the pump is building up pressure in the fuel system, the CVV may be kept open until a selected positive pressure limit has been reached, at which point the valve may be closed. The pressure variation within the sealed and pressurized fuel system is then monitored. If the pressure does not drop beyond a threshold within a selected time period, method 300 may interpret this event as indication that the fuel system has no leaks. Otherwise, method 300 may generate a notification indicating that the fuel system has a leak and return. Alternatively, at 336, the ELCM pump may be activated in a second direction, turning it on in vacuum pressure mode. In this case the CVV may be kept open until a selected vacuum pressure has been reached. In similar fashion to events described for the positive pressure mode, once a selected vacuum pressure has been reached, the CVV may be closed, and the engine controller may track the fuel system pressure variation for a selected time period. Method 300 may then determine if the pressure does not increase beyond a threshold, in which case the fuel system may be deemed leak free. Otherwise, method 300 may generate a system leak notification and return.

FIG. 4 shows a flowchart illustrating a method 400 for drying a wet-fouled spark plug. Method 400 performs the spark plug drying routine referenced in FIG. 3 at 352. After method 300 has determined that an engine is flooded, it proceeds to method 400, where at 402 the engine controller may notify the vehicle operator it is executing a spark plug drying routine. This way a vehicle operator may cease further attempts at starting an engine and the potential draining of the engine's battery may be avoided. At 404, method 400 positions the engine and opens the intake and exhaust valves. At 406 a starter motor, such as starter motor 41 of FIG. 1, or a DC generator in a hybrid vehicle, may rotate the engine. An engine may be rotated in such a way as to position a cylinder piston at a position that minimizes the available volume within the cylinder. In this way, a hot gas flowing through a cylinder during the spark plug drying routine may deliver its thermal energy and fluid convective effect through a smaller cavity, thus enhancing the likelihood of fuel evaporation off the surface of a wet-fouled spark plug. As described in FIG. 1, the point at which piston 36 is at the end of its stroke and closest to the cylinder head (e.g., when cylinder 30 is at its smallest volume) is typically referred to by those of skill in the art as top dead center (TDC). Thus in one embodiment, an engine may be rotated in order for a first cylinder to have both its intake and exhaust valves opened. In some examples, depending on the configuration of the camshaft and cams, both the intake and exhaust valves of the first cylinder may be opened at a given position of the engine (e.g., at the end of the exhaust stroke for the first cylinder). However, in other examples the intake and/or exhaust valve may be opened with the assistance of a variable cam timing mechanism (VCT). The engine may have rotated in such a way that it may be at or near a TDC configuration during the course of its spark plug drying sequence. In one example of the current disclosure, at 410, method 400 may use a variable cam timing (VCT) mechanism to adjust the position of both valves. Referring to FIG. 1, a camshaft actuation system (such as camshaft actuation system 51) may adjust an intake valve (such as intake valve 52) to an open position. Likewise, a camshaft actuation system (e.g., camshaft actuation system 53) may adjust an exhaust valve (e.g., exhaust valve 54) to its open position.

At 414, method 400 may activate a canister heater, such as canister heater 222b. In this way any gases flowing through the canister may be heated. At 418, the first cylinder and its spark plug may be fluidically coupled to the atmosphere by adjusting a plurality of valves of the EVAP system. At 420 the CVV may be opened, or kept open, and CPV may be opened. In this way fresh air may enter through the vent line, flow through the heated EVAP canister, carry with it any previously trapped fuel vapors, continue through the purge line into the intake manifold, and then enter the first cylinder. At 426 all other flow paths may be sealed. This may include closing of the intake throttle valve at 428 and the closure of the VBV at 430. The VBV may be closed to prevent the evaporation and flow of additional fuel vapors from the fuel tank into the EVAP system, while throttle valve may be closed to avoid the release of fuel vapors into the atmosphere and to restrict the routing of heated air into the cylinders. Other flow paths may also be sealed, such as any fluidic couplings to the crankcase ventilation system, EGR, etc.

At 434, the ELCM pump may be activated in a first direction, comprising the operation of the pump in a positive pressure mode. In this way an amount of fresh air may be drawn from the atmosphere through the vent line at a selected flowrate. The drawn air may be heated at the EVAP canister and routed into the first cylinder that may have already been positioned as described at 406, and whose intake and exhaust valves may have already been opened as described at 410. The heated air may evaporate fuel along its way, for example from the canister adsorbent and in particular as it flows past wet-fouled spark plugs, and produce a gas mixture of air and fuel vapors. This gas may then flow into a catalyst, such as exhaust catalyst 270, where the fuel vapors may be trapped for eventual conversion in the catalyst before the gas may be released into the atmosphere through an exhaust passage. At 438 method 400 determines if the spark plug drying routine has been carried out for a threshold duration. The threshold duration may be a predetermined duration predicted to dry even the most fouled spark plugs, such as five or ten seconds. In other examples, the threshold duration may change based on the severity of the wet-fouling. If the threshold has not been met, method 400 may continue the spark plug drying routine by keeping the ELCM pump operating as described at 434. If the drying duration threshold has been met, method 400 proceeds to 442.

At 442, method 400 determines if the spark plug drying routine has been applied to all cylinders. If at 442 method 400 determines that there are cylinders that remain to be dried, method 400 proceeds to 446. At 446 the positioning of the engine and adjusting the intake and exhaust valves of a different cylinder may be performed. At 448, the starter motor, or a DC generator in a hybrid vehicle, may be used to rotate the engine for a second cylinder, which in one example may entail positioning the second cylinder's piston at TDC of the exhaust stroke. At 450, the engine's variable cam timing (VCT) mechanism may be used to open the intake and exhaust valves of the second cylinder. At 438, method 400 may determine if a drying duration threshold has been met. As described for the first cylinder, if the drying duration has not been met, method 400 may continue at 434 the operation of the ELCM pump until the drying duration threshold has been observed. Once the drying of the second cylinder has been determined to be complete at 438, method 400 may again determine if other cylinders remain to be dried and 446 is repeated until each spark plug in an engine has been dried. Once method 400 determines at 442 that all cylinders have been dried, it may proceed to 454 where an engine controller may notify an operator that an engine start may be attempted. Method 400 may end.

FIG. 5 shows an example timeline describing operation of various components of a vehicle's evaporative emissions control systems during a canister purge, followed by a diagnostic test to detect evaporative emissions leaks. Diagram 600 depicts the time-dependent status of the following engine parameters: engine state at 605, throttle valve position at 610, canister purge valve (CPV) at 615 having a default closed position, vapor blocking valve (VBV) at 620 having a default open position, canister vent valve (CVV) at 625 having a default open position, canister heater at 630 having a default deactivated state, and emissions leak control module (ELCM) pump at 635 having a default deactivated status. At 640 a schematic of the time-dependent pressure of the fuel system is also presented. The timeline of a canister purge may be observed between times $t_0$ and $t_1$. The timeline of a leak detection test may be observed between times $t_2$ and $t_4$.

Referring first to the purging of the EVAP canister, at 605 the engine is already operating at time $t_0$, and it continues its operation until time $t_1$. Throughout the same time period, the throttle valve depicted at 610 may be adjusted in a variety of directions, according to the demands of the engine and the vehicle operator. Once an engine controller starts the purging procedure at time $t_0$, 615 illustrates that the canister purge valve is adjusted to its open position, and the vapor blocking valve closed as shown at 620, for the duration of the purge procedure. Since the default position for the canister vent valve is open, diagram 625 shows it remaining open throughout the purge routine. Also at $t_0$, the heater of the EVAP canister is activated, while the ELCM pump remains deactivated, as shown at 630 and 635, respectively. With the vapor blocking valve closed, and the canister vent and canister purge valves open, fresh air may be drawn into the fuel system through the canister vent line because the engine may generate a negative pressure within the EVAP system. This pressure is depicted in diagram 640. Before the purge routine is started, the canister purge valve is closed and the fuel system is fluidically coupled to the atmosphere because the canister vent valve is open. Therefore the fuel system pressure may be near ambient pressure as may be observed before time $t_0$. However, once in purge mode the negative pressure generated by the engine reduces the pressure, as depicted for the time period between $t_0$ and $t_1$. Thus during this time period the heated fresh air flowing through the canister may vaporize the fuel vapors trapped by the adsorbent and may transport them to the engine where they may be combusted.

After the engine is shut off at $t_1$, the pressure approaches atmospheric pressure again. At engine shut off, the throttle valve may be closed, the canister purge valve may be brought back to its closed default position, the vapor blocking valve may be brought to its open default position, and the canister vent valve may be allowed to remain at is default open position. Further, the EVAP canister heater may be brought to its deactivated default state, and the ELCM pump may be allowed to remain in its deactivated default state.

Now, referring to the leak detection portion of diagram 600, the engine controller may direct the start of the leak detection routine at time $t_2$. The engine may remain off for the remainder of the routine as depicted at 605. The throttle valve is in its closed position at time $t_2$ as seen at 610. The canister purge valve and the vapor blocking valve may remain at their default positions, closed and open, respectively, for the duration of the leak detection routine (shown at 615 and 620, respectively). The canister heater will also remain deactivated in its default status throughout the leak detection routine (shown at 630). However, the ELCM pump may be activated at time $t_2$. With the canister purge valve closed, the fuel system is sealed and any fresh air drawn through the canister vent line by the ELCM pump may increase the pressure within the fuel system. The ELCM pump may continue to draw in fresh air until time $t_3$, at which point it may be deactivated, as shown at 635. At the same time the canister vent valve may be closed in order to seal the pressurized fuel system. As shown at 640, during the period of pump operation between time $t_2$ and time $t_3$, the fuel system pressure systematically increases until it reaches a plateau. Once the pump is deactivated and the canister vent valve closed, the fuel system pressure will remain approximately constant between time $t_3$ and time $t_4$, unless there is a fuel system leak. As explained above with respect to method 300 in FIG. 3, the pressure may be monitored for a selected duration, and if the pressure has not dropped beyond a threshold the system may be considered leak free.

After the leak detection routine ends, the modified engine operating parameters may be brought back to their default states. The engine may remain off, and the throttle valve may be brought to an intermediate default position, as shown at 610. The canister purge valve and the vapor blocking valve may remain at their default positions, closed and open, respectively. The canister vent valve may be brought back to its open default position. The EVAP canister heater and the ELCM pump may remain deactivated, which corresponds to their default states. Once the canister vent valve has been opened, the fuel system pressure may return to near atmospheric pressure, as depicted at 640.

As described earlier, the components of the EVAP/ELCM system may be deployed to perform the methods of the current disclosure. Diagram 700 in FIG. 6 illustrates the time-dependent behavior of these and other engine components during execution of spark plug drying method 400 on the sequential drying of two cylinders. Before the drying routine starts, at time $t_0$ these engine components have the following status: starter motor state at 704 having a default deactivated status, first cylinder intake valve at 710 in an open position, first cylinder exhaust valve at 716 in an open position, second cylinder intake valve at 722 in a closed position, second cylinder exhaust valve at 728 in a closed position, the canister heater at 734 having a default deactivated state, the canister vent valve (CVV) at 740 having a default open position, the canister purge valve (CPV) at 746 having a default closed position, the throttle valve position wide open at 752, the vapor blocking valve (VBV) at 758 having a default open position, and the emissions leak control module (ELCM) pump at 764 having a default deactivated status. The timeline of the sequential drying of two cylinders may be observed between times $t_1$ and $t_6$.

At time $t_1$ an engine controller determines that the engine may be flooded, as described in FIG. 3 at 340. Because the first cylinder is in a position where its intake and exhaust valves may already be open, the starter engine may remain deactivated, as shown at 704. The canister heater, as shown at 734, is activated. The heater may remain activated for the duration of the spark plug drying routine. The diagram at 740 shows the canister vent valve remaining open throughout the spark plug drying routine. Also at $t_1$, the following valves are adjusted: the canister purge valve is opened, the throttle valve is closed, and the vapor blocking valve is closed, as shown at 746, 752, and 758, respectively. These valves may remain in these positions throughout the duration of the spark plug drying routine.

Also at $t_1$, the ELCM pump is activated to flow fresh air through the heated canister, as shown at 764. The pump may continue to draw fresh air through the canister vent as long as it is determined that there are flooded cylinders that need drying. The heated fresh air exits the canister, flows through the purge line and is routed to the intake 244 into the first cylinder. The liquid fuel evaporated from the spark plug may be carried by the heated air to the exhaust manifold into the exhaust catalyst. The exhaust catalyst may trap the fuel vapors before the gas is released into the atmosphere via the exhaust passage.

Once a threshold duration of the spark plug drying routine has been met, the starter motor is activated to position a second cylinder for drying at time $t_2$, as shown at 704. The variable cam timing (VCT) mechanism may be activated to open both the intake and exhaust valves of the second cylinder between times $t_2$ and $t_3$, as shown at 710, 716, 722, and 728, respectively. As with the first cylinder, the ELCM pump is activated to flow fresh air through the heated canister and then route it into the second cylinder for a duration threshold depicted by the time interval between $t_3$ and $t_4$. Once it is determined that the drying of the second cylinder may have been completed, the starter motor and the VCT mechanism may reposition the engine and close the intake and exhaust valves of the second cylinder between times $t_4$ and $t_5$.

FIG. 6 illustrates the timeline of the drying routine for two cylinders of a multi-cylinder engine. If there were more cylinders to be dried, the timeline described above would be repeated for the remaining cylinders. At time $t_6$, after all the cylinders have been dried, method 400 may adjust all the system parameters to their default state. The EVAP canister heater and the ELCM may be deactivated. The canister purge valve may be closed, the vapor blocking valve may be opened, and the throttle valve may remain in its closed position, while the canister vent valve may be kept open.

In this way a flooded engine, wherein one or more spark plugs may be determined to be wet-fouled, may be dried by flowing a heated gas through one or more cylinders of said engine while the engine is not rotating. The spark plugs may be determined to be wet-fouled by lack of an engine start after a number of unsuccessful attempts, in a second example by an UEGO sensor determining a fuel rich mixture, and in another example by a WOT signal. The gas may be a mixture of fuel vapors and fresh air drawn in through the canister vent line by the ELCM pump, and flowed through a heated EVAP canister to increase its temperature. Each cylinder may be sequentially subjected to the drying procedure, with each cylinder positioned by a starter motor, or a DC generator in a hybrid vehicle, and its intake and exhaust valves adjusted by a variable cam timing (VCT) mechanism in order to allow for the flow of the heated gas through the cylinder. Once all spark plugs have been dried an operator may be resume attempting an engine start.

The technical effect of determining spark plug wet-fouling and drying the spark plugs of an engine in-situ is to rapidly dry the spark plugs to allow a subsequent engine start with minimal delay.

A method is provided for an engine system comprising, responsive to detecting spark plug fouling prior to an engine start, transferring heat to a gas in the engine system, and flowing the heated gas through one or more cylinders of an engine while the engine is not rotating. A first example of the method includes wherein the spark plug fouling comprises wet fouling occurring as a result of a prior engine start attempt. A second example of the method optionally includes the first example and further includes wherein detecting the wet spark plug fouling comprises detecting the wet spark plug fouling responsive to one or more of a throttle position during engine cranking of the prior engine start attempt, exhaust gas sensor output during the prior engine start attempt, and a threshold number of prior engine start attempts being reached. A third example of the method optionally includes one or both of the first and second examples and further includes wherein transferring heat to a gas in the engine system comprises transferring heat to one or more of fuel vapors and fresh air from an evaporative emission control (EVAP) system, and wherein flowing heated gas through one or more cylinders of the engine comprises flowing one or more of the heated fuel vapors and heated fresh air through the one or more cylinders of the engine. A fourth example of the method optionally includes one or more of the first through third examples and further includes wherein transferring heat to one or more of the fuel vapors and fresh air comprises transferring heat from an electric heater positioned in the EVAP system to one or more of the fuel vapors and fresh air. A fifth example of the method optionally includes one or more of the first through fourth examples and further includes wherein flowing one or more of heated fuel vapors and heated fresh air from the EVAP system through the one or more cylinders of the engine comprises adjusting one or more of engine position and camshaft position to hold each of an intake valve and an exhaust valve of a selected cylinder in a respective open position, activating a pump of the EVAP system to draw fresh air into a fuel vapor canister of the EVAP system and by the electric heater, the electric heater positioned in the fuel vapor canister, and flowing the heated fuel vapors and/or heated fresh air through the selected cylinder. A sixth example of the method optionally includes one or more of the first through fifth examples and further includes opening a canister purge valve and a canister vent valve prior to activating the pump. A seventh example of the method optionally includes one or more of the first through sixth examples and further includes closing an intake throttle prior to activating the pump. An eighth example of the method optionally includes one or more of the first through seventh examples and further includes, after flowing the heated fuel vapors and/or heated fresh air through the selected cylinder for a threshold duration, further adjusting one or more of engine position and camshaft position to hold each of an intake valve and an exhaust valve of a subsequent cylinder in a respective open position.

An embodiment of a method includes a system comprising an engine having a cylinder, the cylinder comprising a spark plug, an intake valve, and an exhaust valve, a variable camshaft timing (VCT) system configured to adjust a position of the intake valve and the exhaust valve, an evaporative emission control (EVAP) system comprising, a fuel vapor canister coupled to a fuel tank, coupled to the engine via a canister purge valve, and to atmosphere via a canister vent valve, a fuel vapor canister heater, and an evaporative leak detection pump coupled between the fuel vapor canister and atmosphere, and a controller storing instructions that when executed cause the controller to responsive to an indication of wet fouling of the spark plug, prior to an engine start, activate the fuel vapor canister heater, open the canister vent valve and canister purge valve, adjust the VCT system to hold each of the intake valve and the exhaust valve in an open position, and activate the pump to flow heated fresh air and/or fuel vapors through the cylinder and over the spark plug. In a first example of the method, a system further comprising a throttle to control intake airflow to the engine and a vent blocking valve coupled between the fuel vapor canister and fuel tank, and wherein the controller stores further instructions that when executed cause the controller to, responsive to the indication of wet fouling, close the throttle and close the vent blocking valve. A second example of the method optionally includes the first example and further includes wherein the controller stores further instructions that when executed cause the controller to, following the engine start, adjust the throttle based on operator-requested torque, deactivate the fuel vapor canister heater, maintain open the canister vent valve, close the canister purge valve, adjust the VCT system based on engine operating parameters, and deactivate the pump. A third example of the method optionally includes one or both of the first and second examples and further includes wherein the controller stores further instructions that when executed cause the controller to, responsive to an indication to perform a fuel vapor canister purge during engine operation, activate the fuel vapor canister heater, maintain open the canister vent valve, open the canister purge valve, maintain closed the vent blocking valve, deactivate the pump, and adjust the VCT system based on engine operating parameters. A fourth example of the method optionally includes one or more of the first through third examples and further includes wherein the controller stores further instructions that when executed cause the controller to, responsive to a fuel tank refill request, deactivate the fuel vapor canister heater, maintain open the canister vent valve, close the canister purge valve, open the vent blocking valve, and deactivate the pump. A fifth example of the method optionally includes one or more of the first through fourth examples and further includes wherein responsive to the indication of wet fouling of the spark plug, the pump is activated to apply pressure to the EVAP system, and wherein the controller stores further instructions that when executed cause the controller to, responsive to an indication to perform an EVAP system leak test, deactivate the fuel vapor canister heater, open the canister vent valve, close the canister purge valve, open the vent blocking valve, and activate the pump, wherein during at least a portion of the EVAP system leak test, the pump is activated to apply vacuum to the EVAP system, and after a threshold pressure in the EVAP is reached, close the canister vent valve and indicate a leak in the EVAP system based on a pressure decay of the EVAP system.

Another embodiment includes a method for an engine, comprising prior to an engine start, and in response to an indication of spark plug fouling, adjusting intake and exhaust valves of an engine cylinder to respective open positions by cranking the engine with a starter motor and adjusting oil flow to a variable cam timing (VCT) system, and routing a mixture of fuel vapors and fresh air from an evaporative emission control (EVAP) system through the cylinder to an exhaust catalyst. A first example of the method, wherein routing the mixture of fuel vapors and fresh air from the EVAP system through the cylinder, comprises coupling the engine to the EVAP system and applying pressure to the EVAP system. A second example of the method optionally includes the first example and further includes wherein coupling the engine to the EVAP system comprises opening a canister purge valve coupling a fuel vapor canister to the engine. A third example of the method optionally includes one or both of the first and second examples and further includes wherein applying pressure to the EVAP system comprises opening a canister vent valve coupling the fuel vapor canister to atmosphere and activating an EVAP system pump to draw fresh air into the fuel vapor canister and to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine system, comprising:
responsive to detecting spark plug fouling prior to an engine start,
transferring heat to a gas in the engine system; and
flowing the heated gas through one or more cylinders of an engine while the engine is not rotating.

2. The method of claim 1, wherein the spark plug fouling comprises wet fouling occurring as a result of a prior engine start attempt.

3. The method of claim 2, wherein detecting the wet spark plug fouling comprises detecting the wet spark plug fouling responsive to one or more of a throttle position during engine cranking of the prior engine start attempt, exhaust gas sensor output during the prior engine start attempt, and a threshold number of prior engine start attempts being reached.

4. The method of claim 1, wherein transferring heat to a gas in the engine system comprises transferring heat to one or more of fuel vapors and fresh air from an evaporative emission control (EVAP) system, and wherein flowing heated gas through one or more cylinders of the engine comprises flowing one or more of the heated fuel vapors and heated fresh air through the one or more cylinders of the engine.

5. The method of claim 4, wherein transferring heat to one or more of the fuel vapors and fresh air comprises transferring heat from an electric heater positioned in the EVAP system to one or more of the fuel vapors and fresh air.

6. The method of claim 5, wherein flowing one or more of heated fuel vapors and heated fresh air from the EVAP system through the one or more cylinders of the engine comprises:
adjusting one or more of engine position and camshaft position to hold each of an intake valve and an exhaust valve of a selected cylinder in a respective open position;
activating a pump of the EVAP system to draw fresh air into a fuel vapor canister of the EVAP system and by the electric heater, the electric heater positioned in the fuel vapor canister; and
flowing the heated fuel vapors and/or heated fresh air through the selected cylinder.

7. The method of claim 6, further comprising opening a canister purge valve and a canister vent valve prior to activating the pump.

8. The method of claim 6, further comprising closing an intake throttle prior to activating the pump.

9. The method of claim 6, further comprising after flowing the heated fuel vapors and/or heated fresh air through the selected cylinder for a threshold duration, further adjusting one or more of engine position and camshaft position to hold each of an intake valve and an exhaust valve of a subsequent cylinder in a respective open position.

10. A system, comprising:
an engine having a cylinder, the cylinder comprising a spark plug, an intake valve, and an exhaust valve;
a variable camshaft timing (VCT) system configured to adjust a position of the intake valve and the exhaust valve;
an evaporative emission control (EVAP) system comprising:
a fuel vapor canister coupled to a fuel tank, coupled to the engine via a canister purge valve, and to atmosphere via a canister vent valve,
a fuel vapor canister heater, and
an evaporative leak detection pump coupled between the fuel vapor canister and atmosphere; and
a controller storing instructions that when executed cause the controller to:
responsive to an indication of wet fouling of the spark plug, prior to an engine start, activate the fuel vapor canister heater, open the canister vent valve and canister purge valve, adjust the VCT system to hold each of the intake valve and the exhaust valve in an open position, and activate the pump to flow heated fresh air and/or fuel vapors through the cylinder and over the spark plug.

11. The system of claim 10, further comprising a throttle to control intake airflow to the engine and a vent blocking valve coupled between the fuel vapor canister and fuel tank, and wherein the controller stores further instructions that when executed cause the controller to, responsive to the indication of wet fouling, close the throttle and close the vent blocking valve.

12. The system of claim 10, wherein the controller stores further instructions that when executed cause the controller to, following the engine start, adjust the throttle based on operator-requested torque, deactivate the fuel vapor canister heater, maintain open the canister vent valve, close the canister purge valve, adjust the VCT system based on engine operating parameters, and deactivate the pump.

13. The system of claim 12, wherein the controller stores further instructions that when executed cause the controller to:
responsive to an indication to perform a fuel vapor canister purge during engine operation, activate the fuel vapor canister heater, maintain open the canister vent valve, open the canister purge valve, maintain closed the vent blocking valve, deactivate the pump, and adjust the VCT system based on engine operating parameters.

14. The system of claim 13, wherein the controller stores further instructions that when executed cause the controller to:
responsive to a fuel tank refill request, deactivate the fuel vapor canister heater, maintain open the canister vent valve, close the canister purge valve, open the vent blocking valve, and deactivate the pump.

15. The system of claim 14, wherein responsive to the indication of wet fouling of the spark plug, the pump is activated to apply pressure to the EVAP system, and wherein the controller stores further instructions that when executed cause the controller to:
responsive to an indication to perform an EVAP system leak test, deactivate the fuel vapor canister heater, open the canister vent valve, close the canister purge valve, open the vent blocking valve, and activate the pump, wherein during at least a portion of the EVAP system leak test, the pump is activated to apply vacuum to the EVAP system; and
after a threshold pressure in the EVAP is reached, close the canister vent valve and indicate a leak in the EVAP system based on a pressure decay of the EVAP system.

16. A method for an engine, comprising:
prior to an engine start, and in response to an indication of spark plug fouling:
adjusting intake and exhaust valves of an engine cylinder to respective open positions by cranking the engine with a starter motor and adjusting a variable cam timing (VCT) system; and
routing a mixture of fuel vapors and fresh air from an evaporative emission control (EVAP) system through the cylinder to an exhaust catalyst.

17. The method of claim 16, wherein routing the mixture of fuel vapors and fresh air from the EVAP system through the cylinder comprises coupling the engine to the EVAP system and applying pressure to the EVAP system.

18. The method of claim 17, wherein coupling the engine to the EVAP system comprises opening a canister purge valve coupling a fuel vapor canister to the engine.

19. The method of claim 18, wherein applying pressure to the EVAP system comprises opening a canister vent valve coupling the fuel vapor canister to atmosphere and activating an EVAP system pump to draw fresh air into the fuel vapor canister and to the engine.

* * * * *